United States Patent [19]
Matsuoka et al.

[11] Patent Number: 5,844,386
[45] Date of Patent: Dec. 1, 1998

[54] POWER STEERING DEVICE

[75] Inventors: Hirofumi Matsuoka, Souraku-gun; Yasuji Noritou; Ken Fukuda, both of Kashiwara, all of Japan

[73] Assignee: Koyo Seiko Co. Ltd., Osaka, Japan

[21] Appl. No.: 676,727

[22] Filed: Jul. 8, 1996

[30] Foreign Application Priority Data

Jul. 12, 1995 [JP] Japan ................................... 7-200408

[51] Int. Cl.⁶ ................ B62D 5/04; H05K 3/30
[52] U.S. Cl. .................... 318/293; 361/690; 361/707; 361/717
[58] Field of Search ................ 318/287, 291, 318/293; 361/600, 679, 688, 690, 704, 707, 709, 717–720, 722, 748, 760, 777, 805, 807

[56] References Cited

U.S. PATENT DOCUMENTS 4,218,724 8/1980 Kaufman ................................ 361/395
5,497,289 3/1996 Sugishima et al. ................ 318/558 X
5,602,451 2/1997 Kohge et al. ........................... 318/293

FOREIGN PATENT DOCUMENTS

| 0535422 | 4/1993 | European Pat. Off. . |
| 0593913 | 4/1994 | European Pat. Off. . |
| 4410061 | 9/1994 | Germany . |
| 63-156867 | 10/1988 | Japan . |
| 5-185938 | 7/1993 | Japan . |
| 6-11865 | 3/1994 | Japan . |

*Primary Examiner*—Bentsu Ro
*Attorney, Agent, or Firm*—Thelen Reid & Priest LLP

[57] ABSTRACT

A switching element for controlling electric power to be supplied to a motor for generating steering assistance power, and a circuit which outputs a control signal to the switching element according to a driving condition are incorporated in an insulating casing. The insulating casing is attached to a housing of a power steering device. An elastic heat-conducting insulating sheet lies between the switching element and the housing. The switching element is pressed against the housing via the sheet.

6 Claims, 13 Drawing Sheets

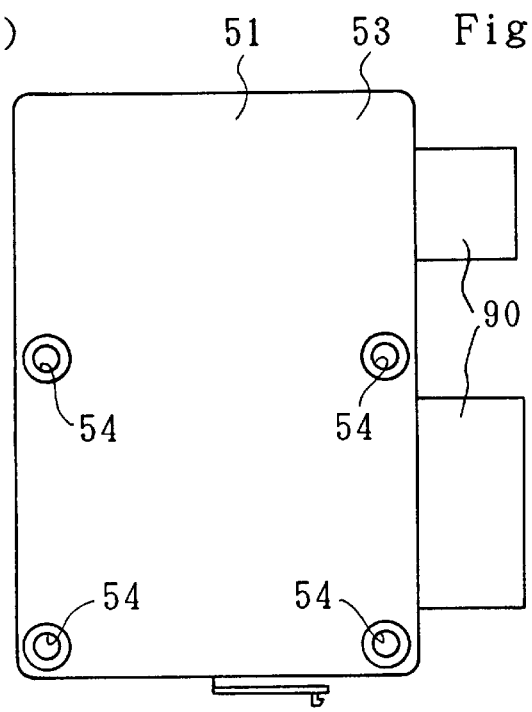
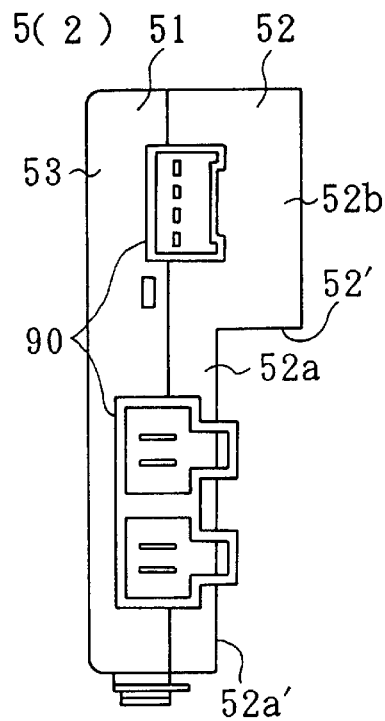
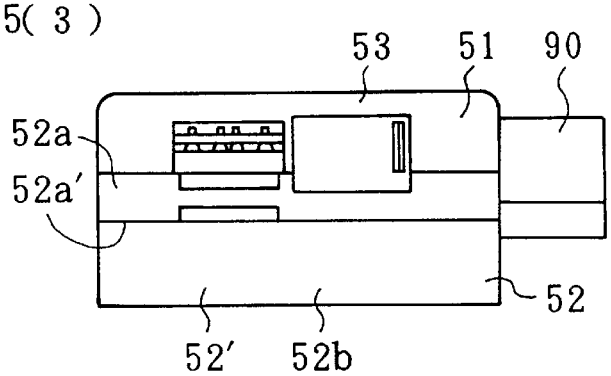

POWER STEERING DEVICE

FIELD OF THE INVENTION

The present invention relates to a power steering device having a switching element for controlling electric power to be supplied to a motor, which generates steering assistance power. The present invention is applicable to power steering devices, such as an electric power steering device directly using the output of the motor as steering assistance power, or an electric pump type hydraulic power steering device using oil pressure produced by a pump driven by the output of the motor as steering assistance power.

DESCRIPTION OF RELATED ART

Traditionally, there has been used a power steering device having a housing, a motor for generating steering assistance power, a driving circuit including a switching element, such as a transistor for controlling the electric power to be supplied to the motor or the like, and a control circuit which outputs a control signal to the switching element according to a driving condition, such as steering torque or the like.

Traditionally, the control circuit has been isolated from the driving circuit including such a switching element. It has therefore been necessary to connect the control circuit with the driving circuit via a harness. However, the use of such a harness poses the problems of insufficient noise resistance, increased weight, increased number of wire connectors, poor reliability, and increased cost.

As a solution to these problems in the prior art, the control circuit and the driving circuit are integrated with each other by mounting them on the same substrate in the housing of the power steering device (Japanese Patent Unexamined Publication No. H5-185938).

In this case, the switching element generates a great amount of heat due to heavy current. To prevent this heat from affecting the control circuit, a radiating plate must be provided, which, however, poses the problems of increased device weight and increased number of assembly processes.

In another prior art, the switching element is in contact with the housing of the power steering device, so that the housing serves as a radiating plate to radiate the heat from the switching element without such a radiating plate (Japanese Utility Model Examined Publication No. H6-11865, Japanese Utility Model Unexamined Publication No. SHO63-156867).

However, a gap between the housing and the switching element is formed when the switching element is directly contacted with the housing. Such a gap hampers satisfactory heat conduction from the switching element to the housing. This poses the problem of adverse effect on the control circuit due to a failure of sufficient radiation.

Accordingly, the object of the present invention is to provide a power steering device free of the above-described problems in the prior art.

SUMMARY OF THE INVENTION

The power steering device of the present invention comprises a housing, a motor for generating steering assistance power, a switching element for controlling electric power to be supplied to the motor, a circuit which outputs a control signal to the switching element according to a driving condition, an insulating casing incorporating both the switching element and circuit, and an elastic heat-conducting insulating sheet between the switching element and the housing, wherein the casing is attached to the housing so that the switching element is pressed against the housing via the sheet.

According to the power steering device of the present invention, the switching element for controlling electric power to be supplied to the steering assistance power generating motor and the circuit which outputs a control signal to the switching element are incorporated in the same insulating casing, so that harnesses, which are required when the switching element is isolated from the circuit, can be retrenched. This configuration makes it possible to improve noise resistance, reduce device size and weight, decrease the number of wire connectors, and achieve improved reliability and reduced cost.

Again, according to the power steering device of the present invention, the housing can serve as a radiating plate, because the switching element is pressed against the housing via a heat-conducting sheet. This configuration obviates the necessity of a dedicated radiating plate, thus contributing to reduce device size and weight and decrease the number of assembly processes.

Moreover, the heat-conducting sheet is elastic, so that it can be closely contacted with the switching element and housing. Therefore, satisfactory heat conduction from the switching element to the housing and enhanced heat radiation are ensured, so that the adverse effect on the control circuit is prevented.

It is preferable that one side of the switching element incorporated into the casing protrudes from the face of the casing opposite to the housing, and that the one side of the switching element is pressed against the housing via the sheet.

By protruding the one side of the switching element, which is pressed against the housing, from the casing's face opposite to the housing, the close contact of the heat-conducting sheet with the one side of the switching element is ensured, so that heat radiation is improved.

It is preferable that the casing is integrated with a housing of a connector, which connects the switching element to the motor and power source, and that an electrode constituting the connector and a wire, which connects the electrode to the switching element, are each formed from a platelike electroconductive element incorporated into the casing.

By integrating the casing with the housing of the connector for connecting the switching element to the motor and power source, and also incorporating the electrode constituting the connector into the casing, it is possible to decrease the total number of connector required, and achieve improved reliability and reduced cost.

Since the electrode constituting the connector, which connects the switching element to the motor and power source, and the wire, which connects the electrode to the switching element, are each formed from the platelike electroconductive element incorporated into the casing, the cross-sectional areas of the electrode and wire can be increased. Therefore, it is possible to achieve wiring of compact size, low cost and low wiring impedance which allows passage of heavy current, which in turn decreases the amount of the generation of heat, suppresses noise due to heavy current, and prevents the adverse effect on the control circuit.

It is preferable that the casing incorporates a condenser connected to a wire, which connects the switching element to the power source for supplying electric power to the motor, a relay connected with the wire, and a motor current detection resistor connected to the switching elements via a wire, and that the wires are each formed from a platelike electroconductive element incorporated into the casing.

Since the condenser connected to the wire, which connects the switching element to the power source for supplying electric power to the motor, the relay which is connected to the wire, and the motor current detection resistor, which is connected to the switching element via the wire, are incorporated into the casing, the noise source on the power source side, i.e., the impedance of the wire connecting the power source side terminals of the switching elements to the condenser, can be suppressed, so that the noise, which occurs upon switching operation of the switching elements in high-frequency band, is effectively absorbed.

By connecting the condenser, relay, and motor current detection resistor to the wires, which are each formed from the platelike electroconductive element, the heat generated in these components can be released to the wires, whereby the temperature rising of the components can be suppressed. Again, this configuration reduces the overall impedance of the motor driving circuit, which has the switching elements subjected to heavy current, condensers, relay, and motor current detection resistor, so that the voltage drop in the control circuit can be reduced. Therefore, noise generated upon switching of the switching elements is effectively reduced, and the range of voltage applicable to the motor is effectively expanded. Moreover, the reduced overall impedance of the motor driving circuit is effective in the reduction of the generation of heat.

BRIEF DESCRIPTION OF THE DRAWINGS

FIG. 5 (1) is a plan view of the casing of the electric power steering device of the embodiment of the present invention; FIG. 5 (2) is a front view of the casing; FIG. 5 (3) is a side view of the casing.

FIG. 10 (2) is a sectional side view for explanation of the arrangement of the wires constituting the casing.

DETAILED DESCRIPTION OF PREFERRED EMBODIMENTS

An embodiment of the present invention is hereinafter described with reference to drawings.

Figure 1:
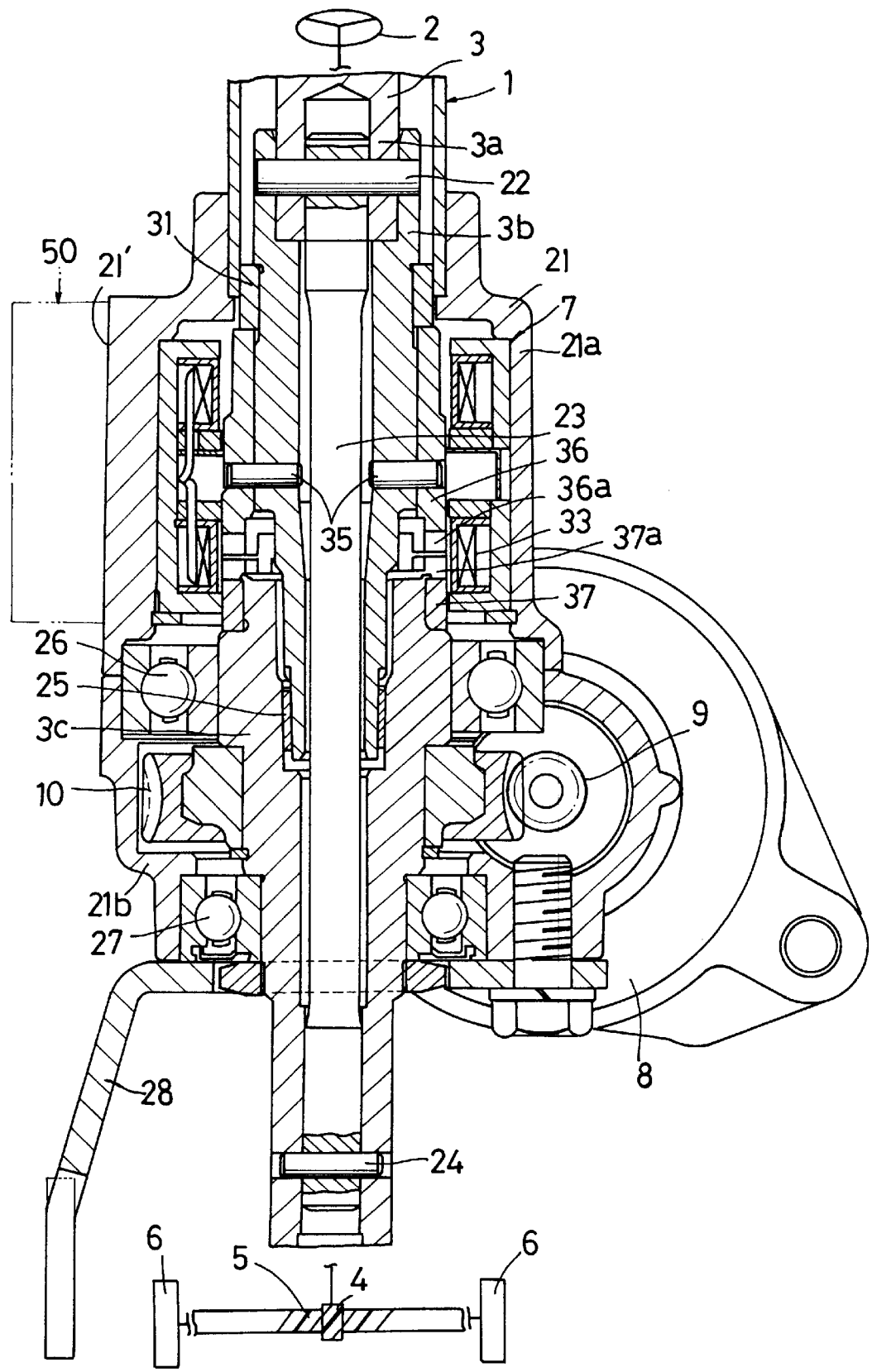
FIG. 1 is a cross-sectional view of a electric power steering device of an embodiment of the present invention.

A electric power steering device 1 illustrated by FIG. 1 transmits steering torque, which is generated by operation of a steering wheel 2, to a pinion 4 via a steering shaft 3 to move a rack 5 meshed with the pinion 4, whereby steering angle of wheels 6 connected to the rack 5 via a tie rod, knuckle arm, etc. (not illustrated) are changed.

A torque sensor 7 for detecting the steering torque transmitted via the steering shaft 3 is provided. The torque sensor 7 has an aluminum housing 21 covering the steering shaft 3. The housing 21, formed from mutually joined two elements 21a, 21b, is attached to a vehicle body via a bracket 28.

In the housing 21, the steering shaft 3 is supported by a bush 31 and bearings 26, 27. The steering shaft 3 is divided into a first shaft 3a joined to the steering wheel 2, a cylindrical second shaft 3b joined to the first shaft 3a via a pin 22, and a cylindrical third shaft 3c fitted around the outer circumference of the second shaft 3b via a bush 25 in a manner such that both shaft 3b, 3c are rotatable relative to each other. One end of a torsion bar 23 inserted in the centers of the shafts 3a, 3b, 3c is joined to the first shaft 3a and the second shaft 3b via the pin 22. The other end of the torsion bar 23 is joined to the third shaft 3c via a pin 24. By this configuration, the second shaft 3b and the third shaft 3c are elastically rotatable relative to each other according to the steering torque.

A ring 36 is fitted around the second shaft 3b, and fixed to the shaft 3b with a pin 35. The third shaft 3c is forced into a ring 37. A number of teeth 36a, 37a are provided on one end of each of the rings 36, 37 along their circumference. The teeth 36a of one ring 36 and the teeth 37a of the other ring 37 face to each other. A coil 33 surrounding the gap between the two rings 36, 37 is housed in the housing 21. When the second shaft 3b and the third shaft 3c rotate relative to each other according to steering torque, the facing area of the teeth 36a, 37a of the two rings 36, 37 changes, resulting in a change of magnetic resistance to the magnetic flux generated by the coil 33. On the basis of the change of output from the coil 33 according to the change of the magnetic resistance, the torque sensor 7 can output a signal corresponding to the steering torque.

A worm wheel 10 is forced on the outer circumference of the third shaft 3c. A worm 9 meshed with the worm wheel 10 is joined to the output shaft of a motor 8 for generating steering assistance power. The motor 8 is driven according to the steering torque detected by the torque sensor 7 and to the vehicle speed detected by a vehicle speed sensor (not illustrated), whereby the steering assistance power is provided according to the driving conditions. The motor 8 is attached to the housing 21.

Figure 2:
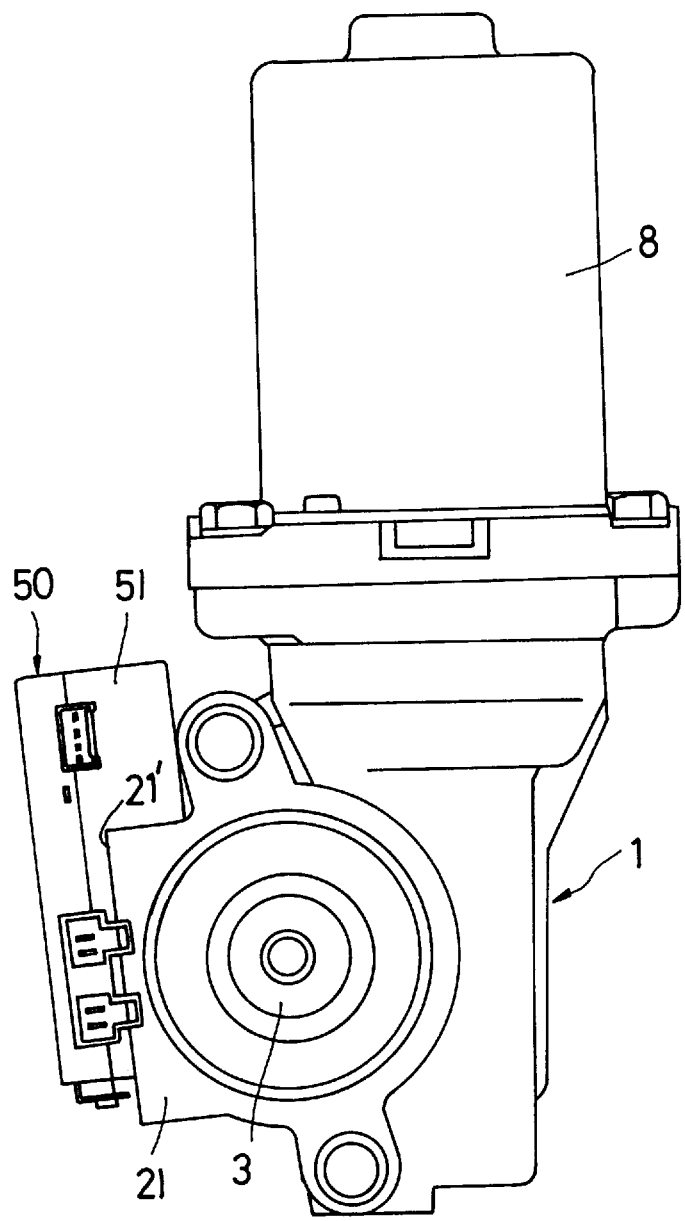
FIG. 2 is a plan view of the electric power steering device of the embodiment of the present invention.
Figure 3:
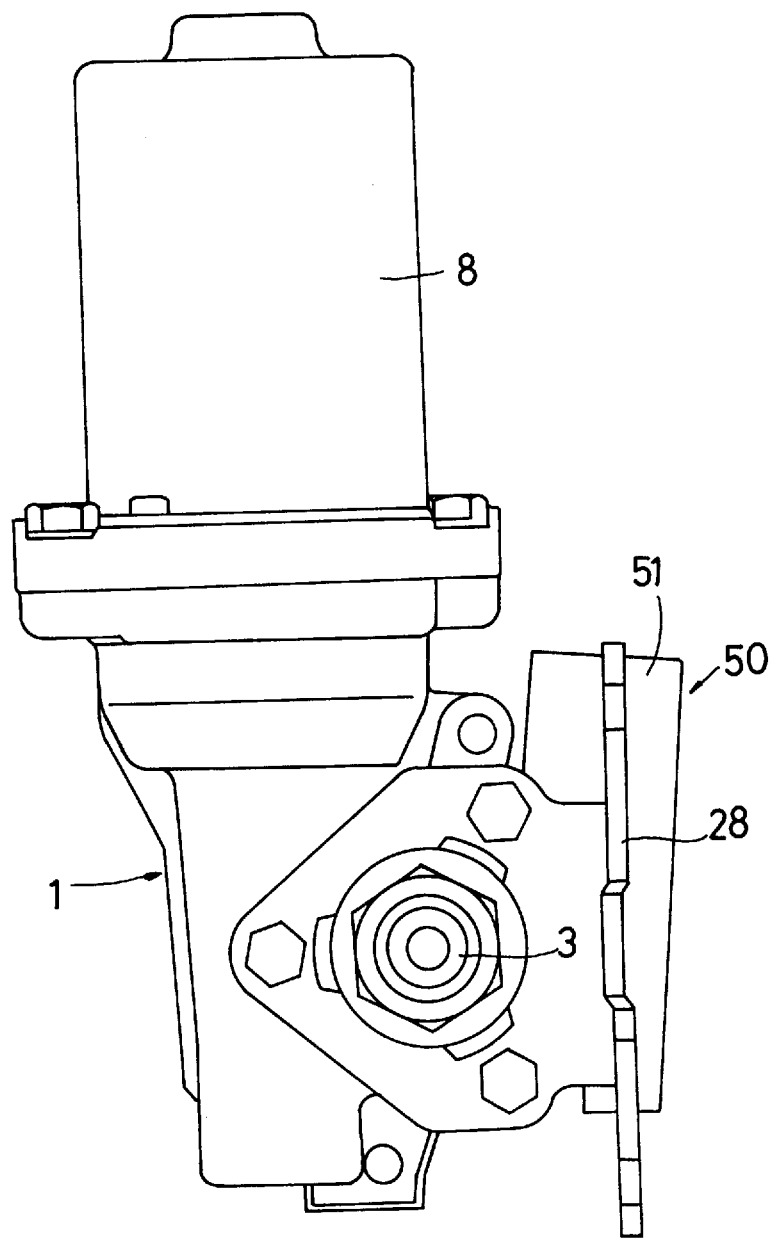
FIG. 3 is a bottom view of the electric power steering device of the embodiment of the present invention.
Figure 4:
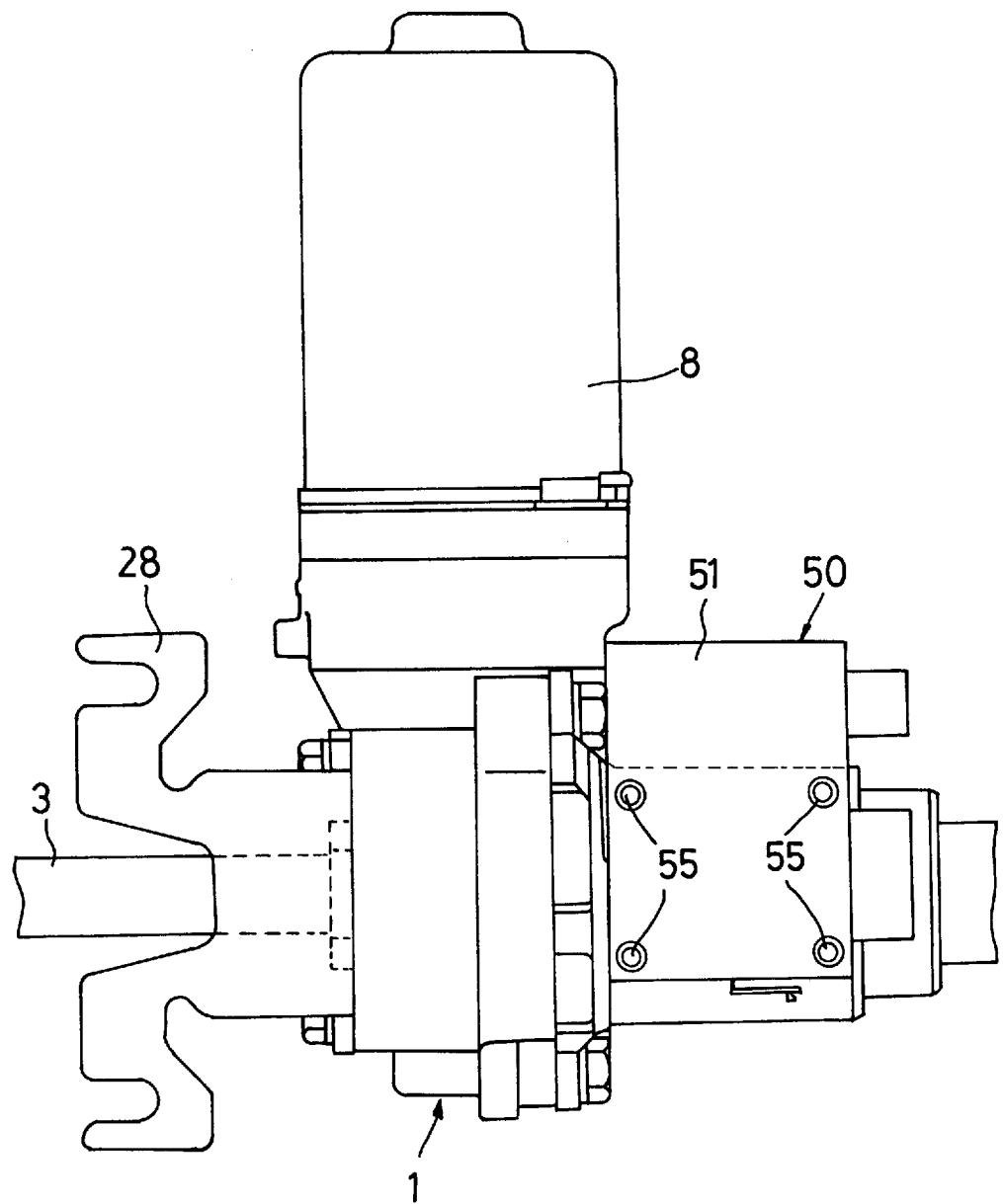
FIG. 4 is a front view of the electric power steering device of the embodiment of the present invention.

On the outer circumference of the housing 21 of the torque sensor 7, a face 21' for attaching the controller 50 of the motor 8 thereon is formed. The attaching face 21' is made flat. As illustrated in FIGS. 2 through 4, the controller 50 is attached with bolts 55.

The casing 51 of the controller 50 is made of an insulating material. In the present embodiment, the casing is made of PPS (polyphenylene sulfide). As illustrated in FIG. 5 (1), the casing 51 has a roughly rectangular plan view. As illustrated in FIGS. 5 (2) and 5 (3), the casing 51 is formed from a main body 52 and a cover 53 covering one side of the main body 52. The main body 52 has a first portion 52a of lesser depth and a second portion 52b of greater depth divided by a step 52' formed on the other side. The step 52' and the bottom face 52a' of the first portion 52a are each opposed to the housing 21. The first portion 52a and the cover 53 are provided with through holes 54 for the abovementioned bolts 55.

Figure 6:
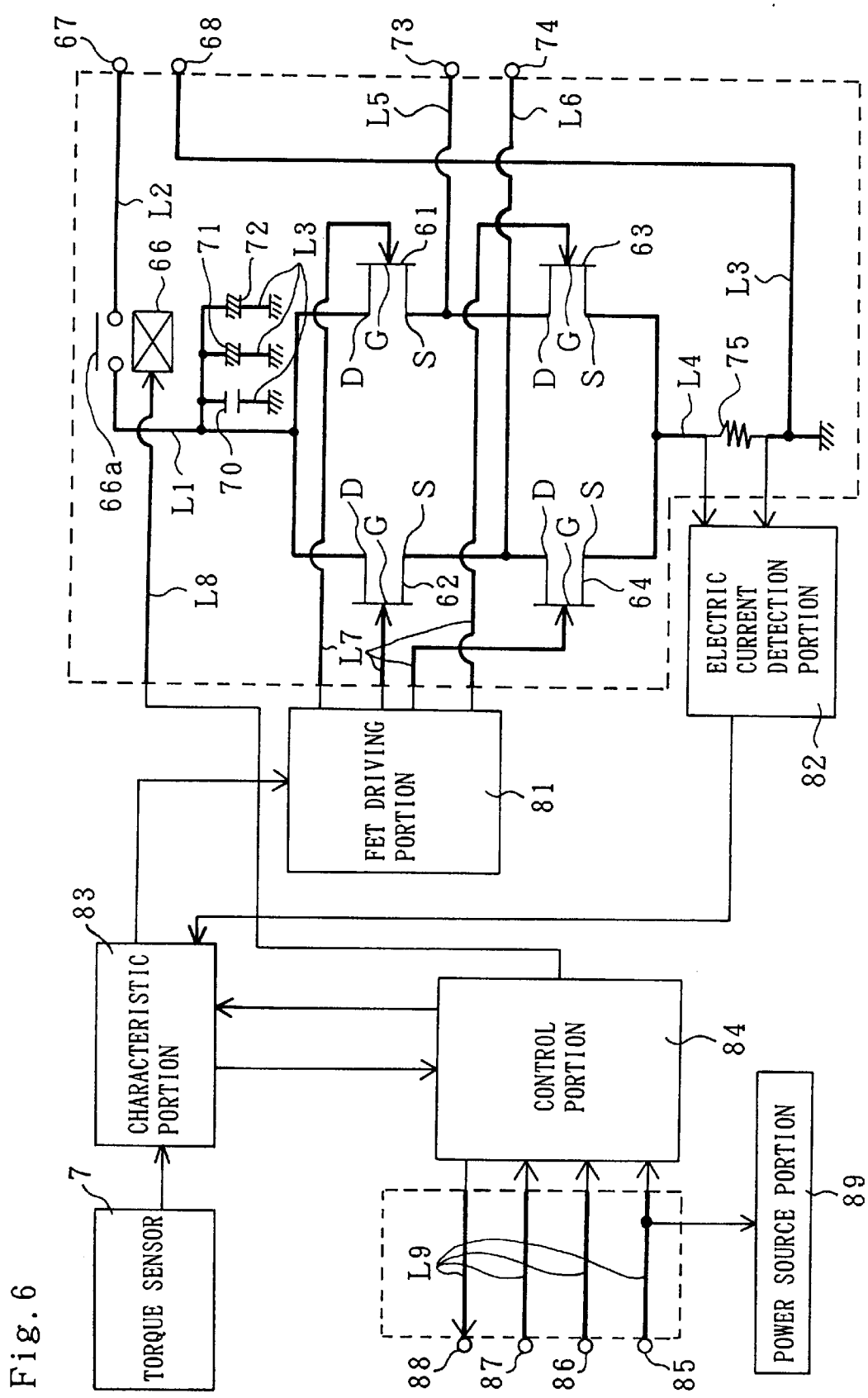
FIG. 6 is a circuit diagram of the electric power steering device of the embodiment of the present invention.

As illustrated in FIG. 6, the circuit of the controller 50 is configured with a driving circuit and a control circuit. The driving circuit comprises first through fourth FETs (field effect transistors), i.e., switching elements 61, 62, 63, 64, a fail-safe relay 66, a laminated ceramic condenser 70, electrolytic condensers 71, 72, and a shunt resistor (motor current detection resistor) 75. The control circuit comprises an FET driving portion 81, an electric current detection portion 82, a characteristic portion 83, a control portion 84, and a power source portion 89, as indicated by functional blocks.

The first through fourth FETs 61, 62, 63, 64 control electric power to be supplied to the motor 8. The drain terminal D of each of the first and second FETs 61, 62 is connected to the relay switch 66a of the fail-safe relay 66 via a wire L1. The switch 66a is connected to one 67 of a pair of electrodes 67, 68, which constitute a connector to be connected to a power source for driving the motor 8, via a wire L2. The portion between the relay switch 66a and the contact point of the first and second FETs 61, 62 is connected to the condensers 70, 71, 72 for noise-eliminating. These condensers 70, 71, 72 are each grounded via a wire L3. The source terminal S of each of the third and fourth FETs 63, 64 is connected to the shunt resistor 75 via a wire L4. The shunt resistor 75 is connected to the other 68 of the electrodes 67, 68 constituting the connector to be connected to the power source via the wire L3. The portion between the shunt resistor 75 and the other electrode 68 is grounded via the wire L3. One 73 of a pair of electrodes 73, 74, which constitute a connector to be connected to the motor 8, is connected to the source terminal S of the first FET 61 and the drain terminal D of the third FET via a wire L5. The other 74 of the electrodes 73, 74 is connected to the source terminal S of the second FET 62 and the drain terminal D of the fourth FET 64 via a wire L6.

The gate terminal G of each of the FETs 61, 62, 63, 64 is connected to the FET driving portion 81 via a wire L7. The relay 66 is connected to the control portion 84 via wires L8. The shunt resistor 75 is connected to the electric current detection portion 82 for detecting motor current. The FET driving portion 81 and the electric current detection portion 82 are connected to the characteristic portion 83. The characteristic portion 83 is connected to the control portion 84 and torque sensor 7. The control portion 84 is connected to an electrode 85 which constitutes a connector to be connected to an engine start key switch, an electrode 86 which constitutes a connector to be connected to an igniter for sensing engine rotation rate, an electrode 87 which constitutes a connector to be connected to a vehicle speed sensor, and an electrode 88 which constitutes a connector to be connected to an external monitor for self-diagnosis via wires L9.

The control portion 84 is connected to the power source portion 89 when the key switch is on. The control portion 84 outputs exciting current to the coil of the relay 66 to close the relay switch 66a, and outputs a characteristic instruction signal to the characteristic portion 83 based on the vehicle speed sensing signal from the vehicle speed sensor. The characteristic portion 83 calculates the appropriate value of steering assistance power based on the characteristic instruction signal and sensed steering torque, and then compares the appropriate value with the actual steering assistance power corresponding to the driving current of the motor 8 fed back from the electric current detection portion 82, and then outputs an instruction signal to the FET driving portion 81 on the basis of the comparative assessment to change the actual steering assistance power to the appropriate value. The appropriate value of the steering assistance power increases with the steering torque, and it decreases with the vehicle speed when the steering torque is constant, whereby good running stability at high speeds and reduction of driver's steering effort at low speeds are ensured. The FET driving portion 81 applies a PWM signal as a control signal to the gate terminals G of the FETs 61, 62, 63, 64, according to the instruction signal to change the steering assistance power. Therefore, electric power to be supplied to the motor 8 is controlled by switching operation of the FETs 61, 62, 63, 64, so that steering assistance power according to the steering torque and vehicle speed is provided. Because the voltage fluctuation in the power source terminal of the motor driving circuit by the switching operation of the FETs 61, 62, 63, 64 can be smoothed by the condensers 70, 71, 72, adverse effect on the present device and other devices is prevented.

In the event that, for example, the difference between the driving current corresponding to the instruction signal to change the steering assistance power, which depends on vehicle speed and steering torque, and the actual driving current fed back from the electric current detection portion 82 is excessive, or the sensed engine rotation rate do not match with the vehicle speed, the control portion 84 blocks the exciting current for the coil of the relay 66 to quit steering assistance. Again, the control portion 84 has a self-diagnosis function, that is to say, it can output a signal to enable the abovementioned external monitor to indicate the abnormal conditions.

Figure 7:
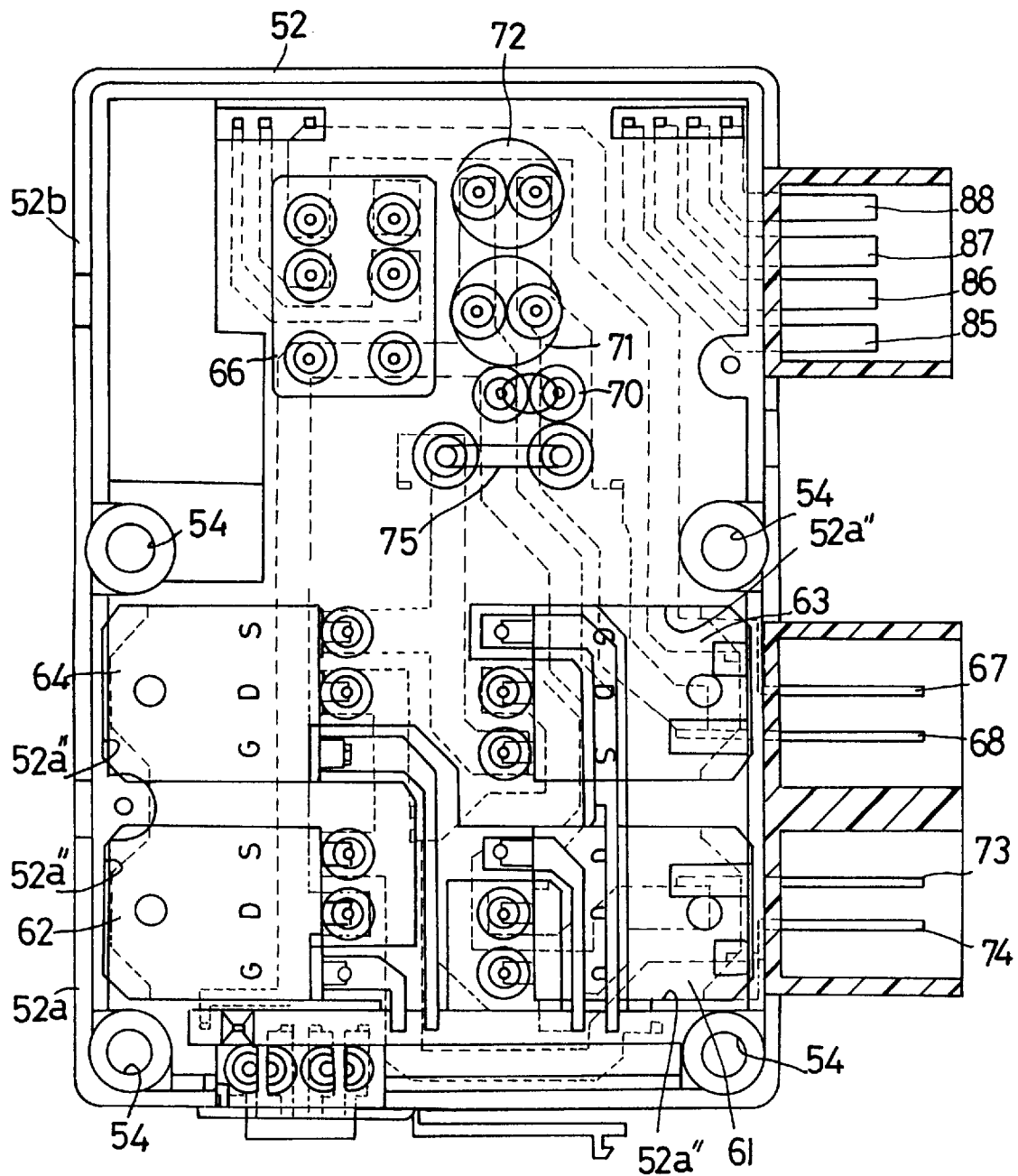
FIG. 7 is a sectional plan view for explanation of the arrangement of the elements constituting a circuit in the casing of the electric power steering device of the embodiment of the present invention.
Figure 8:
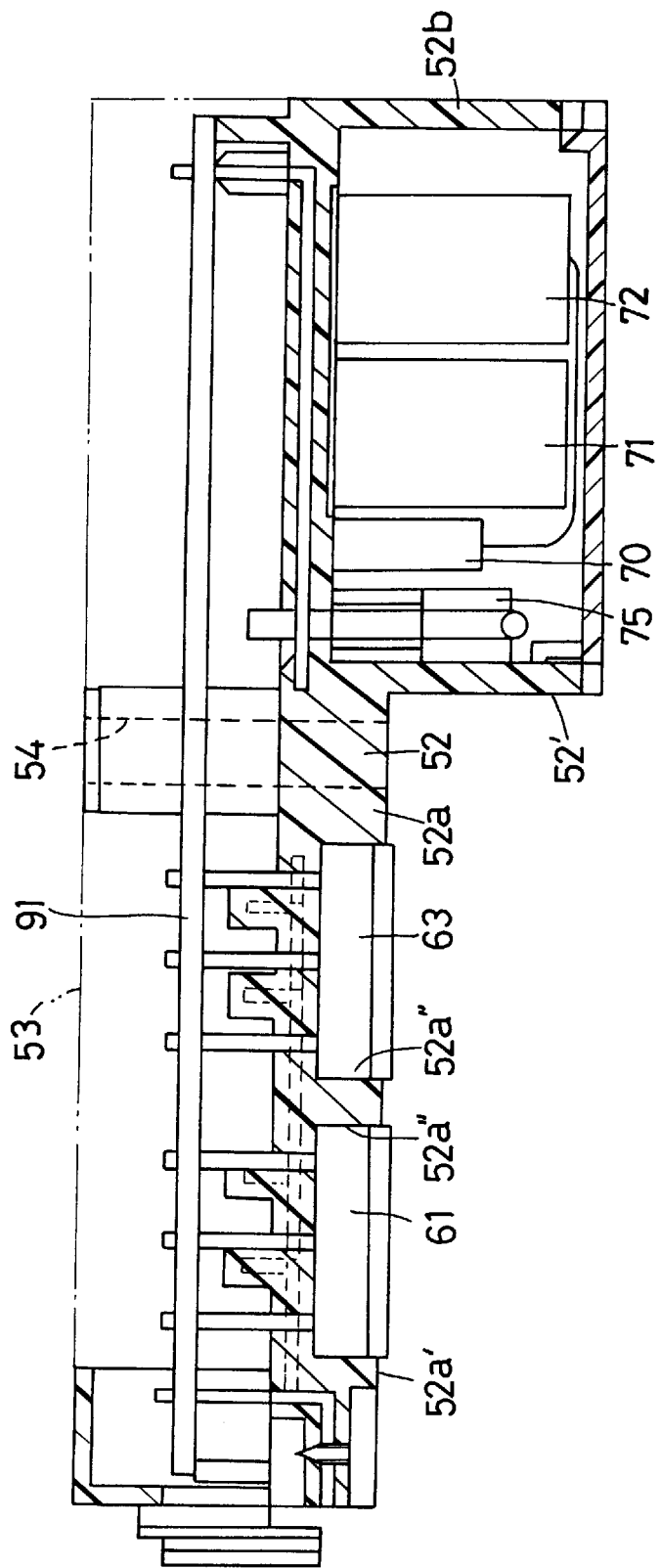
FIG. 8 is a sectional front view for explanation of the arrangement of the elements constituting the circuit in the casing of the electric power steering device of the embodiment of the present invention.
Figure 9:
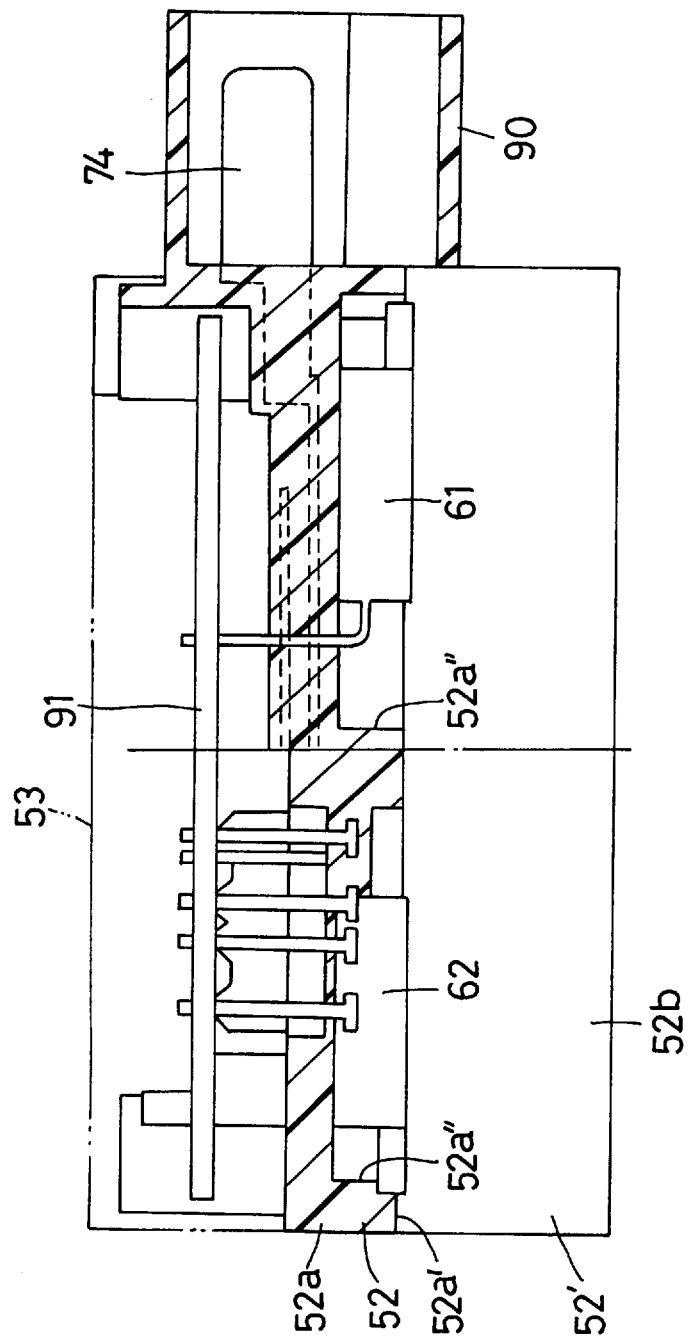
FIG. 9 is a sectional side view for explanation of the arrangement of the elements constituting the circuit in the casing of the electric power steering device of the embodiment of the present invention.

In the abovementioned circuit illustrated in FIG. 6, the circuit elements within the dotted portions, i.e., FETs 61, 62, 63, 64, relay 66, condensers 70, 71, 72, shunt resistor 75, electrodes 67, 68, 73, 74, 85, 86, 87, 88 constituting connectors, and wires L1 through L9 are all incorporated into the main body 52 of the casing 51 so as to be modularized. To be move precise, FIGS. 7 through 9 show the positions of the abovementioned circuit elements in the casing 51. The FETs 61, 62, 63, 64 are each fitted into a pit 52a" formed in the first portion 52a of the main body 52. In the state of being fitted into the pit 52a", one side of each of the FETs 61, 62, 63, 64 protrudes from the bottom face 52a' of the first portion 52a opposite to the housing 21 of the torque sensor 7, as illustrated in FIG. 8. The relay 66, condensers 70, 71, 72, and shunt resistor 75 are attached to the second portion 52b of the main body 52.

Figure 10:
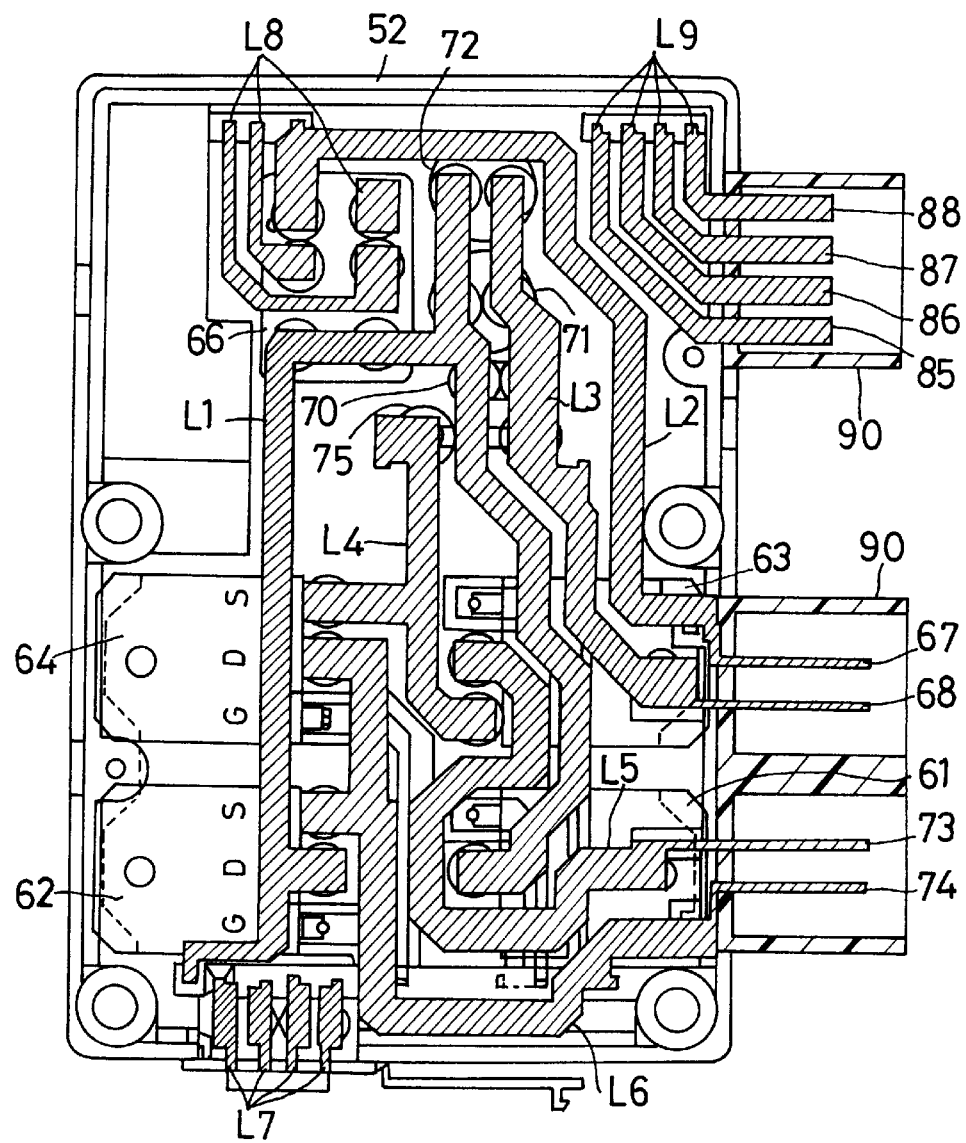
FIG. 10 (1) is a sectional plan view for explanation of the arrangement of the wires constituting the circuit in the casing of the electric power steering device of the embodiment of the present invention.
Figure 10:
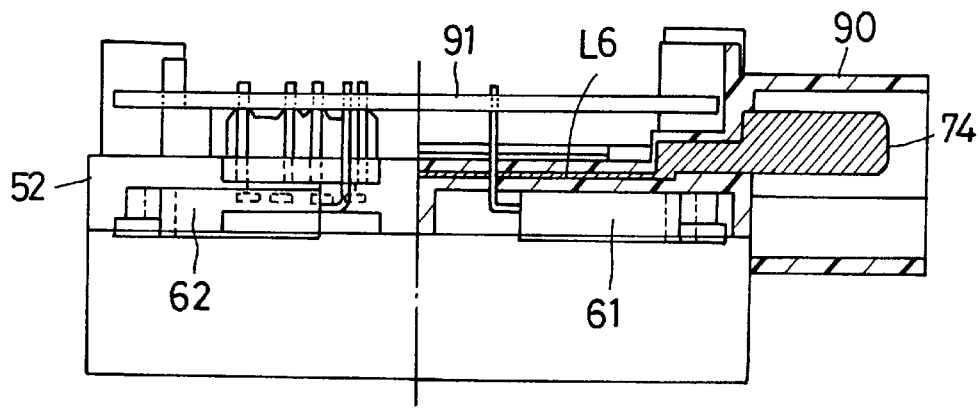
Figure 11:
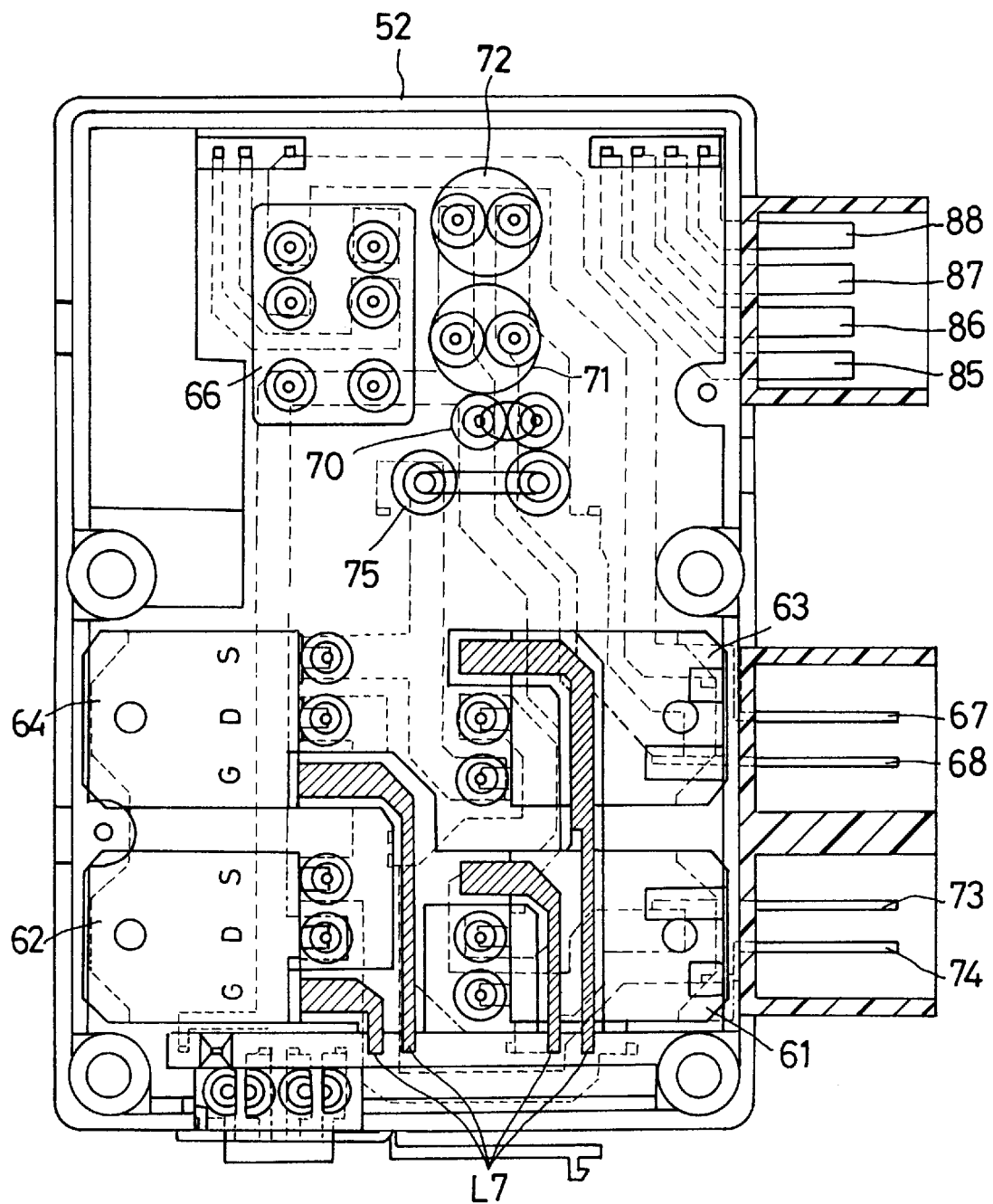
FIG. 11 is another sectional plan view for explanation of the arrangement of the wires constituting the circuit in the casing of the electric power steering device of the embodiment of the present invention.

In FIGS. 10 (1), 10 (2) and 11, the electrodes 67, 68, 73, 74, 85, 86, 87, 88 constituting the connectors and the wires L1 through L9 are shown by hatch. The electrodes 67, 68, 73, 74, 85, 86, 87, 88 are each formed from a platelike electroconductive element protruding from the main body 52 of the casing 51, and covered by the connector housing 90 integrated with the main body 52. The wires L1 through L9 are each formed from a platelike electroconductive element buried in the main body 52. The wires L7 for connecting the gate terminals G of the FETs 61, 62, 63, 64 to the FET driving portion 81 shown in FIG. 11 are distant from the remaining wires L1 through L6, L8 and L9 shown in FIGS. 10 (1) and 10 (2) in the direction of the wall thickness of the main body 52. The electrodes 67, 68, 73, 74 constituting the connectors between the power source and the motor 8 are each formed from a platelike electroconductive element, and portions of the wires L2, L3, L5, L6 connecting the electrodes 67, 68, 73, 74 to the FETs 61, 62, 63, 64 are each integrated with the platelike electroconductive element. The electrodes 85, 86, 87, 88 constituting the connectors to be connected to the control portion 84 are each formed from a platelike electroconductive element, and the wires L9 connecting the electrodes 85, 86, 87, 88 to the control portion 84 are each integrated with the platelike electroconductive element. The other electrode 68 constituting the connector to be connected to the power source serves as a grounding terminal of the condensers 70, 71, 72 and the shunt resistor 75.

The control circuit having the abovementioned FET driving portion 81, electric current detection portion 82, characteristic portion 83, control portion 84, and power source portion 89 can be configured mainly with an IC chip (not illustrated). As illustrated in FIGS. 7 through 9, the IC chip can be mounted on a printed board 91 attached to the main body 52 of the casing 51. The printed board 91 is distant from the abovementioned driving circuit in the vertical direction of FIGS. 8 and 9, and is connected to the driving circuit via wires running along the vertical direction of FIGS. 8 and 9. The torque sensor 7 can be connected to the characteristic portion 83 via wires soldered to the printed board 91.

Figure 12:
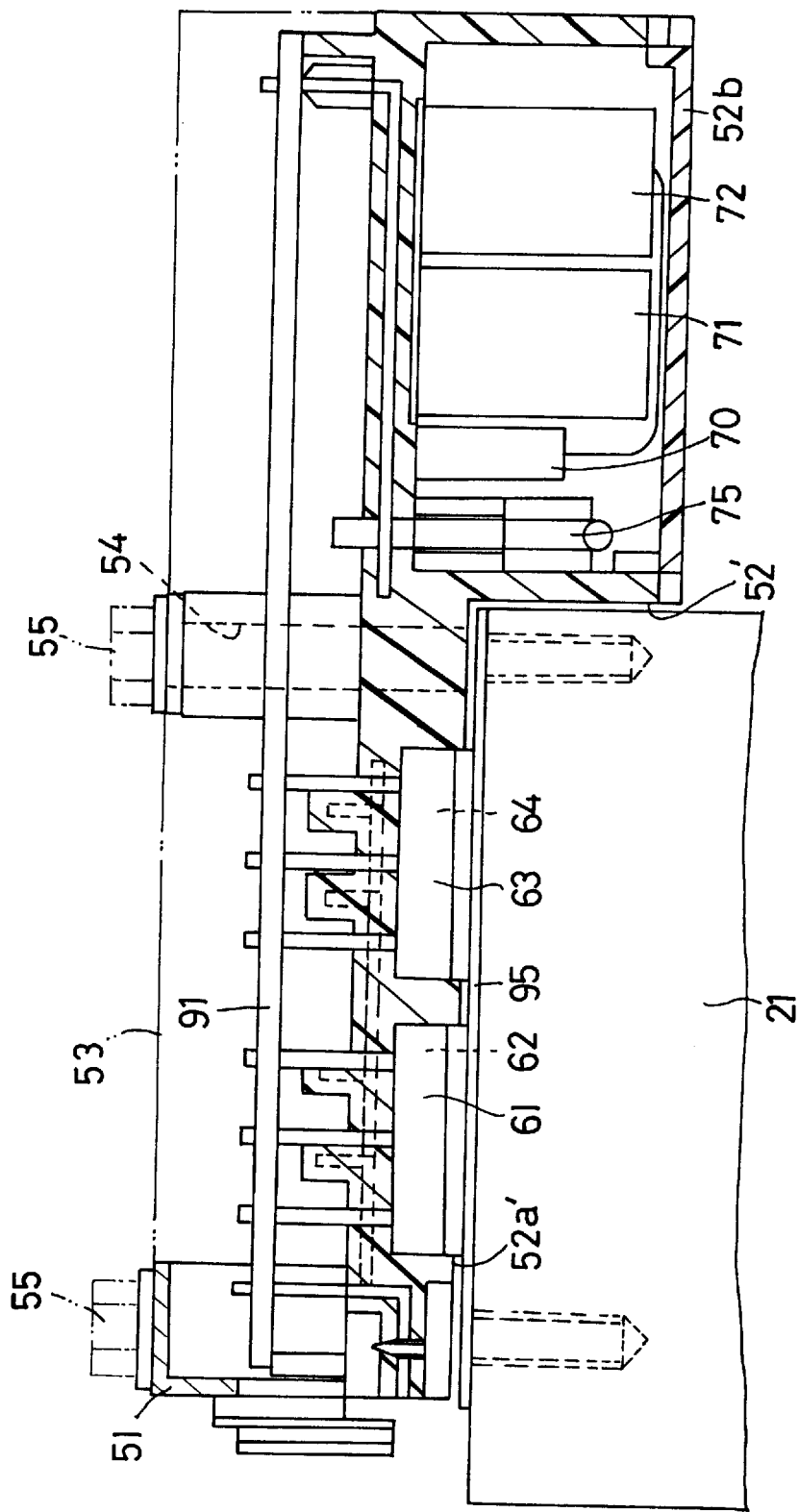
FIG. 12 is a cross-sectional view for explanation of the state of the casing attached to the housing of the electric power steering device of the embodiment of the present invention.
Figure 13:
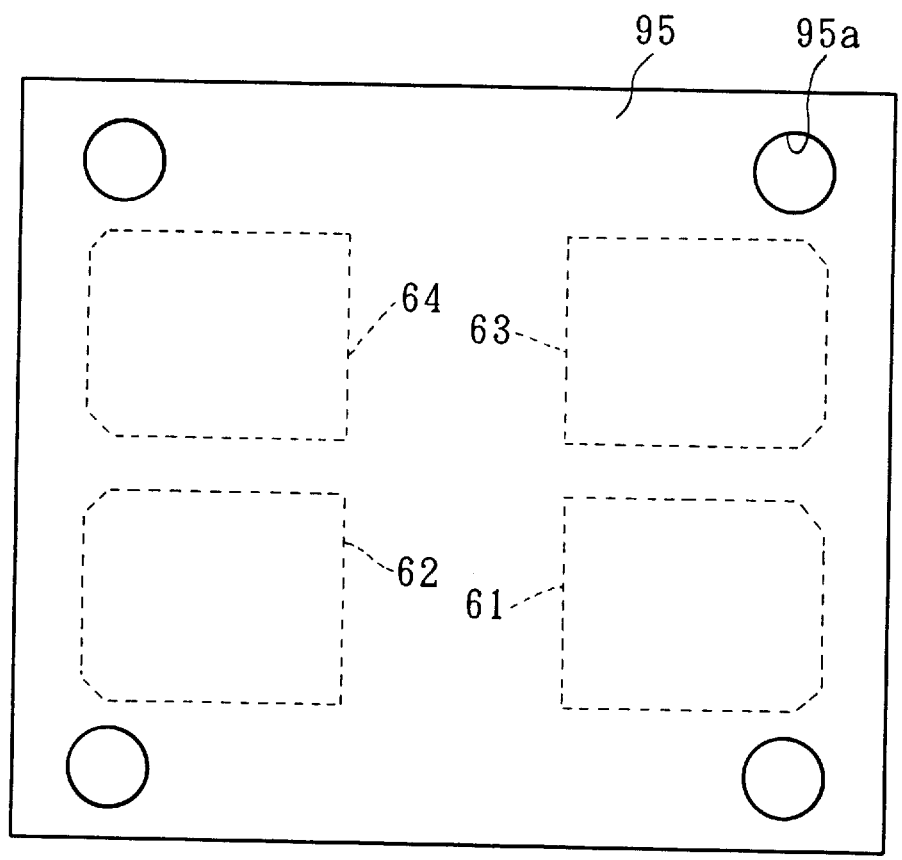
FIG. 13 is a plan view of the sheet for attaching the casing of the electric power steering device of the embodiment of the present invention.

As illustrated in FIG. 12, an elastic heat-conducting insulating sheet 95 between the FETs 61, 62, 63, 64 and the housing 21 of the torque sensor 7 is provided. The sheet 95 is more elastically deformable than the FETs 61, 62, 63, 64 and housing 21. An example material for the sheet 95 is a heat-conducting rubber sheet containing glass fiber. As illustrated in FIG. 13, the sheet 95 has a size such that it can come in contact with one side of each of the FETs 61, 62, 63, 64. Again, the sheet 95 has through holes 95a for the abovementioned bolts 55. By attaching the casing 51 to the housing 21 with the volts 55, one side of each of the FETs 61, 62, 63, 64 is pressed against the housing 21 via the sheet 95.

In the above constitution, the FETs 61, 62, 63, 64 for controlling the electric power to be supplied to the steering assistance power generating motor 8 and the circuit which outputs control signals to the FETs 61, 62, 63, 64 are incorporated in the same insulating casing 51, so that harnesses, which are required when the FETs 61, 62, 63, 64 are isolated from the circuit, can be retrenched. It is therefore possible to improve noise resistance, reduce device size and weight, decrease the number of wire connectors, and achieve improved reliability and reduced cost.

Because the FETs 61, 62, 63, 64 are pressed against the housing 21 via the heat-conducting sheet 95, the housing 21 can serve as a radiating plate, whereby the necessity of a dedicated radiating plate is obviated, resulting in reduced device size and weight and decreased number of assembly processes.

The heat-conducting sheet 95 is elastic, so that it can be closely contacted with the FETs 61, 62, 63, 64 and housing 21. Therefore, the radiating effect can be improved by satisfactorily conducting the heat from the FETs 61, 62, 63, 64 to the housing 21, so that adverse effect on the control circuit can be prevented. Because one side of each of the FETs 61, 62, 63, 64 pressed against the housing 21 protrudes from the face 52a' of the casing 51 opposite to the housing 21, the heat-conducting sheet 95 can be surely brought into close contact with one side of each of the FETs 61, 62, 63, 64, whereby the radiating effect can be improved.

The casing 51 is integrated with the housing 90 of the connectors for connecting the FETs 61, 62, 63, 64 to the motor 8 and power source, and the electrodes 67, 68, 73, 74 constituting the connectors are also incorporated into the casing 51, whereby the number of connectors is decreased, resulting in improved reliability and reduced cost. Since the electrodes 67, 68, 73, 74 and the wires L1 through L6 for connecting the electrodes 67, 68, 73, 74 to the FETs 61, 62, 63, 64 are each formed from a platelike electroconductive element incorporated into the casing 51, the cross-sectional areas of the electrodes 67, 68, 73, 74 and wires L1 through L6 can be increased, whereby compact inexpensive wiring of low impedance allowing passage of heavy current can be achieved, resulting in decreased heat generation and suppressed noise due to heavy current, which in turn prevents the adverse effect on the control circuit.

By incorporating the condensers 70, 71, 72, which are connected to the wires L1, L2, L3, L4 for connecting the FETs 61, 62, 63, 64 to the power source portion 89 to supply electric power to the motor 8, the relay 66, which is connected to the wires L1, L2, L3, L4, and the shunt resistor 75, which is connected to the FETs 61, 62, 63, 64 via the wires L1, L2, L3, L4 for detecting the motor current, into the casing 51, the noise source on the power source side, i.e., the impedance of the wires L1, L2, L3, L4 connecting the power source side terminals of the FETs 61, 62, 63, 64 to the condensers 70, 71, 72 can be suppressed. Therefore, the noise, which occurs upon switching operation of the FETS 61, 62, 63, 64 in the high-frequency band, is effectively absorbed.

By connecting the condensers 70, 71, 72, relay 66 and shunt resistor 75 to the wires L1, L2, L3, L4, which are each formed from a platelike electroconductive element, the heat generated in the components 70, 71, 72, 66, 75 can be released to the wires L1, L2, L3, L4, whereby temperature rising of the components 70, 71, 72, 66, 75 can be suppressed. Again, because the overall impedance of the motor driving circuit, which has the FETs 61, 62, 63, 64 subjected to heavy current, is reduced, the voltage drop in the control circuit can be reduced. Therefore, noise generated upon switching of the FETs 61, 62, 63, 64 is effectively reduced, and the range of voltage applicable to the motor 8 is effectively expanded. Moreover, the reduced overall impedance of the motor driving circuit is effective in the reduction of the generation of heat.

The present invention is not limited to the above embodiment. For example, although the casing 51 is attached to the housing 21 of the torque sensor 7 in the above embodiment, it can be attached to another housing, as long as the housing constitute a power steering device. Again, the FETs are used as switching elements in the above embodiment, other transistors, thyristors, and the like can be used instead. Again, although the control signals to the switching elements are output according to steering torque and vehicle speed in the above embodiment, they can be output according to other parameters of driving conditions, such as steering torque and steering angle. Again, the present invention can be applicable to electric pump type hydraulic power steering devices using oil pressure generated by a pump driven by a motor as steering assistance power, in this case, the casing can be attached to the pump housing.

What is claimed is:

1. A power steering device, comprising; a housing; a motor for generating steering assistance power;

a switching element for controlling electric power to be supplied to the motor;

a circuit which outputs a control signal to the switching element according to a driving condition;

an insulating casing incorporating both the switching element and the circuit; and an elastic heat-conducting insulating sheet between the switching element and the housing, wherein the casing is attached to the housing so that the switching element is pressed against the housing via the sheet.

2. The power steering device according to claim 1, wherein:

one side of the switching element incorporated into the casing protrudes from the face of the casing opposite to the housing, and the one side of the switching element is pressed against the housing via the sheet.

3. The power steering device according to claim 2, wherein:

the casing is integrated with a housing of a connector, which connects the switching element to the motor and a power source; and wherein an electrode constituting the connector and a wire, which connects the electrode to the switching element, are each formed from a platelike electroconductive element incorporated into the casing.

4. The power steering device according to claim 2, wherein:

the casing incorporates a condenser connected to a wire, which connects the switching element to the power source for supplying electric power to the motor, a relay connected with the wire, and a motor current detection resistor connected to the switching elements via a wire, and the wires are each formed from a platelike electroconductive element incorporated into the casing.

5. The power steering device according to claim 1, wherein:

the casing is integrated with a housing of a connector, which connects the switching element to the motor and a power source; and wherein an electrode constituting the connector and a wire, which connects the electrode to the switching element, are each formed from a platelike electroconductive element incorporated into the casing.

6. The power steering device according to claim 1, wherein:

the casing incorporates a condenser connected to a wire, which connects the switching element to the power source for supplying electric power to the motor, a relay connected with the wire, and a motor current detection resistor connected to the switching elements via a wire, and the wires are each formed from a platelike electroconductive element incorporated into the casing.

* * * * *